US012767265B2

(12) United States Patent
Biffard

(10) Patent No.: US 12,767,265 B2
(45) Date of Patent: Oct. 20, 2026

(54) VEHICLE CONTROL SYSTEM FOR AN ELECTRIC VEHICLE, ELECTRIC VEHICLE, AND METHOD OF OPERATING AN ELECTRIC VEHICLE

(71) Applicant: Zero Motorcycles, Inc., Scotts Valley, CA (US)

(72) Inventor: Ryan Biffard, Kelowna (CA)

(73) Assignee: ZERO MOTORCYCLES, INC., Scotts Valley, CA (US)

( * ) Notice: Subject to any disclaimer, the term of this patent is extended or adjusted under 35 U.S.C. 154(b) by 407 days.

(21) Appl. No.: 18/235,379

(22) Filed: Aug. 18, 2023

(65) Prior Publication Data

US 2024/0059368 A1 Feb. 22, 2024

Related U.S. Application Data

(60) Provisional application No. 63/399,029, filed on Aug. 18, 2022.

(51) Int. Cl.
*B62K 23/04* (2006.01)
*B62K 23/06* (2006.01)

(52) U.S. Cl.
CPC .............. *B62K 23/04* (2013.01); *B62K 23/06* (2013.01)

(58) Field of Classification Search
CPC ................................ B62K 23/04; B62K 23/06
See application file for complete search history.

(56) References Cited

U.S. PATENT DOCUMENTS 4,887,687 A 12/1989 Asai et al.
6,105,700 A 8/2000 Williams et al.
(Continued)

FOREIGN PATENT DOCUMENTS

CN 112776929 A 5/2021
EP 2617634 A1 7/2013
(Continued)

OTHER PUBLICATIONS

Cycle News, "Electric Motion Trials Bikes Review," published May 26, 2022, available at https://web.archive.org/web/20220526190551/https://www.cyclenews.com/ 2022/05/article/electric-motion-trials-bikes-review/ (Year: 2022).*
(Continued)

*Primary Examiner* — Christopher B Wehrly
(74) *Attorney, Agent, or Firm* — Carter, DeLuca & Farrell LLP

(57) ABSTRACT

A control system for an electric vehicle includes a first control device adapted to output a first signal indicative of a torque demand from an electric motor of the vehicle; a second control device adapted to output a second signal indicative of a negative torque demand from the electric motor; and a controller adapted to receive the first signal and the second signal and to control the electric motor in accordance with the first and second signals. The controller is adapted to control the electric motor to propel the vehicle in response to the torque demand indicated by the first signal exceeding the negative torque demand indicated by the second signal and to control the electric motor to regeneratively brake the vehicle in response to the negative torque demand indicated by the second signal exceeding the torque demand indicated by the first signal.

17 Claims, 9 Drawing Sheets

(56) References Cited

U.S. PATENT DOCUMENTS

| | | | |
|---|---|---|---|
| 6,321,144 B1 | 11/2001 | Crombez | |
| 6,481,523 B1 | 11/2002 | Noro et al. | |
| 6,516,910 B2 | 2/2003 | Buell et al. | |
| D527,314 S | 8/2006 | Czysz | |
| 7,121,570 B2 | 10/2006 | Parker | |
| 7,165,301 B2 | 1/2007 | Miyashiro | |
| 7,226,066 B2 | 6/2007 | Ichihara et al. | |
| 7,328,910 B2 | 2/2008 | Czysz | |
| D583,717 S | 12/2008 | Brown et al. | |
| 7,556,276 B1 | 7/2009 | Dunlap | |
| 7,665,563 B2 | 2/2010 | Misaki et al. | |
| 7,815,005 B2 | 10/2010 | Masuda et al. | |
| 7,913,793 B2 | 3/2011 | Kofuji | |
| 7,980,347 B2 | 7/2011 | Nagao et al. | |
| 8,083,018 B2 | 12/2011 | Prielinger et al. | |
| 8,550,201 B2 | 10/2013 | Uchiyama et al. | |
| 8,955,637 B2 | 2/2015 | Nishiyama et al. | |
| 9,033,090 B2 | 5/2015 | Kuwabara | |
| 9,828,058 B2 | 11/2017 | Ishii et al. | |
| 10,000,252 B2 | 6/2018 | Takaya | |
| 10,780,937 B2 | 9/2020 | Aydoung et al. | |
| 11,260,934 B2 | 3/2022 | Reitinger et al. | |
| 11,485,446 B2 | 11/2022 | Seger | |
| 2001/0024062 A1 | 9/2001 | Yoshino | |
| 2003/0169002 A1 | 9/2003 | Hughes | |
| 2008/0196960 A1 | 8/2008 | Brown et al. | |
| 2014/0291050 A1* | 10/2014 | Yates | B62K 11/04 290/1 R |
| 2018/0099675 A1* | 4/2018 | Boisvert | B60W 10/02 |
| 2020/0231241 A1* | 7/2020 | Knitt | B62K 11/00 |
| 2020/0331440 A1* | 10/2020 | Stubberud | B60T 7/16 |

FOREIGN PATENT DOCUMENTS

| | | | |
|---|---|---|---|
| EP | 3730337 | A1 | 10/2020 |
| FR | 2825340 | A1 | 12/2002 |
| JP | 2779821 | B2 | 7/1998 |
| JP | 3785117 | B2 | 6/2006 |
| WO | 9956997 | A2 | 11/1999 |

OTHER PUBLICATIONS

International Report on Patentability issued in corresponding International Application No. PCT/EP2023/030523 dated Feb. 4, 2025, pp. 1-7.

International Search Report and Written Opinion issued in corresponding International Application No. PCT/US2023/030523 dated Nov. 6, 2023, pp. 1-9.

Carousell, “Y15/Y16 Swing Arm”, https://www.carousell.sg/p/y15-y16-swing-arm-1119236535/, accessed on Nov. 30, 2023, pp. 1-3.

Seng Cycle World, “Y15 ZR Racing Swing Arm Hyper”, https://www.sengcycleworld.com/spare-part/swing-arm/SKU-A-11615-UNIT-1272?limit=100, accessed on Nov. 30, 2023, pp. 1-4.

“China Wuxi Factory Direct Sales Motorcycle Swing Arm, Rear Fork”, https://www.alibaba.com/product-detail/China-Wuxi-factory-direct-sales-motorcycle_1600290273633.html, accessed on Nov. 30, 2023, pp. x-x.

Tradekey, “TDR CNC Rear Swing Arm for Dirt Bike”, https://www.tradekey.com/product-free/Tdr-Cnc-Rear-Swing-Arm-For-Dirt-Bike-563486.html, accessed on Nov. 30, 2023, pp. 1-10.

Schüppel, Denny, et al., “CFRP Motorcycle Rear Swing Arm”, Worldwide, Lightweight Design, Jun. 2018, pp. 38-31, vol. 11.

motorcycle.com, Press Release, “BMW Wins Innovation Award For Carbon Fiber Swingarm”, Apr. 2018, pp. 1-7.

Pinterest, “Motorcycle Rear Swing Arm Modified CNC”, https://www.pinterest.com/pin/ 826340231601060815/, accessed on Nov. 30, 2023, pp. 1-3.

Pitbikestore.It, “Alluminium Pit Bike Swingarm”, https://pitbikestore.it/en/466-alluminium-pit-bike-swingarm.html, accessed on Nov. 30, 2023, pp. 1-3.

Extended European Search Report issued by the European Patent Office on Jun. 29, 2026 in corresponding EP Patent Application No. 23855477.8.

* cited by examiner

VEHICLE CONTROL SYSTEM FOR AN ELECTRIC VEHICLE, ELECTRIC VEHICLE, AND METHOD OF OPERATING AN ELECTRIC VEHICLE

CROSS-REFERENCE TO RELATED APPLICATIONS

The present application claims the benefit of, and priority to, U.S. Provisional Patent Application No. 63/399,029, filed on Aug. 18, 2022, which is expressly incorporated herein in its entirety by reference thereto.

FIELD OF THE INVENTION

The present invention relates to a vehicle control system for an electric vehicle, an electric vehicle, and a method of operating an electric vehicle.

BACKGROUND INFORMATION

A conventional motorcycle is powered by an internal combustion engine that drives the rear wheel of the motorcycle via a multi-gear transmission. The transmission is typically a sequential transmission and is connected to the rear wheel by a chain drive, belt drive, or shaft drive. The multi-gear transmission includes, for example, four to six gears, and the driver can change gears utilizing the motorcycle's clutch lever, generally mounted on the left-hand side of the handlebar, and gear shift, generally located forward of a foot pedal located on the left-hand side of the motorcycle. A lever for operating the front wheel brake of the motorcycle is usually located on the right-hand side of the handlebar.

Electric motorcycles usually do not include a multi-gear transmission. Instead, an electric motor drives the rear wheel directly via a chain, belt, or shaft drive. Accordingly, since there is no multi-speed transmission in an electric motorcycle, no clutch lever is present or needed.

SUMMARY

According to an example embodiment of the present invention, a control system for an electric vehicle including an electric motor and an energy storage device, the electric motor being operable as a motor supplied with electrical energy from the energy storage device to drive at least one wheel of the vehicle to propel the vehicle, the electric motor operable as a generator to regeneratively brake the vehicle, includes: a first control device adapted to output a first signal indicative of a torque demand, e.g., a positive torque demand, a negative torque demand, and/or a zero torque demand, from the electric motor; a second control device adapted to output a second signal indicative of a negative torque demand from the electric motor; and a controller adapted to receive the first signal and the second signal and to control the electric motor in accordance with the first signal and the second signal. The controller is adapted to control the electric motor to propel the vehicle in response to the torque demand indicated by the first signal exceeding the negative torque demand indicated by the second signal and to control the electric motor to regeneratively brake the vehicle in response to the negative torque demand indicated by the second signal exceeding the torque demand indicated by the first signal.

According to an example embodiment of the present invention, a two-wheel electric vehicle, includes: a front wheel; a rear wheel; an energy storage device; an electric motor operable as a motor supplied with electrical energy from the energy storage device to drive the rear wheel to propel the vehicle and operable as a generator to regeneratively brake the vehicle; and a control system. The control system includes: a first control device adapted to output a first signal indicative of a torque demand, e.g., a positive torque demand, a negative torque demand, and/or a zero torque demand, from the electric motor; a second control device adapted to output a second signal indicative of a negative torque demand from the electric motor; and a controller adapted to receive the first signal and the second signal and to control the electric motor in accordance with the first signal and the second signal. The controller is adapted to control the electric motor to propel the vehicle in response to the torque demand indicated by the first signal exceeding the negative torque demand indicated by the second signal and to control the electric motor to regeneratively brake the vehicle in response to the negative torque demand indicated by the second signal exceeding the torque demand indicated by the first signal.

According to an example embodiment of the present invention, a method of controlling an electric vehicle, including an electric motor and an energy storage device, the electric motor being operable as a motor supplied with electrical energy from the energy storage device to drive at least one wheel of the vehicle to propel the vehicle, the electric motor operable as a generator to regeneratively brake the vehicle, includes: outputting a first signal by a first control device, to a controller, indicative of a torque demand, e.g., a positive torque demand, a negative torque demand, and/or a zero torque demand, from the electric motor; outputting a second signal by a second control device, to the controller, indicative of a negative torque demand from the electric motor; and controlling the electric motor, by the controller, in accordance with the first signal and the second signal, by controlling the electric motor to propel the vehicle in response to the torque demand indicated by the first signal exceeding the negative torque demand indicated by the second signal and controlling the electric motor to regeneratively brake the vehicle in response to the negative torque demand indicated by the second signal exceeding the torque demand indicated by the first signal.

The first control device may include a throttle mounted on a handlebar of the vehicle.

The second control device may include a hand-operable lever mounted on a handlebar of the vehicle.

The first control device may include a throttle mounted on a first side of a handlebar of the vehicle, and the second control device may include as a hand-operable lever mounted on a second side of the handlebar opposite the first side.

The motor may be adapted to recharge the energy storage device in the generator mode.

The vehicle may be arranged as a two-wheel electric vehicle.

The vehicle may not include a manually-operated clutch, e.g., the vehicle may not include a multi-gear transmission or may include an automatic, multi-gear transmission.

The second control device may be independent of a front brake lever of the vehicle and independent of a rear brake pedal of the vehicle.

The vehicle may include a front brake lever arranged on a first side of a handlebar of the vehicle and adapted to engage a front brake of the vehicle and a rear brake pedal adapted to engage a rear brake of the vehicle, the first control device may include a throttle and arranged on the first side of the handlebar of the vehicle, and the second control device may include a hand-operated lever and arranged on a second side of the handlebar opposite the first side.

The second control device may include a hand-operated lever and a rotational sensor adapted to detect a rotation of the lever and to output the second signal based on the rotation of the lever.

The second control device may include a spring-loaded, hand-operated lever and a spring adapted to urge the lever toward a rest position and to provide tactile feedback to a driver of the vehicle.

The rotational sensor may be adapted to output the second signal indicative of a rotational position of the lever.

The rotational sensor may be adapted to output the second signal indicative of a rotational displacement of the lever.

The controller may be adapted to control the electric motor based on a rate of change of the second signal.

The controller may be adapted to control an output device adapted to output audible, visual, and/or tactile signal based on the first and/or second signals.

The vehicle may be arranged as a trials motorcycle that does not include a seat.

The vehicle may include a handlebar, a front brake lever arranged on a first side of the handlebar of the vehicle and adapted to engage a front brake of the vehicle, and a rear brake pedal adapted to engage a rear brake of the vehicle, the first control device may include a throttle and may be arranged on the first side of the handlebar of the vehicle, and the second control device may include a hand-operated lever and may be arranged on a second side of the handlebar opposite the first side.

Further features and aspects of example embodiments of the present invention are described in more detail below with reference to the appended schematic Figures.

DETAILED DESCRIPTION

Figure 1:
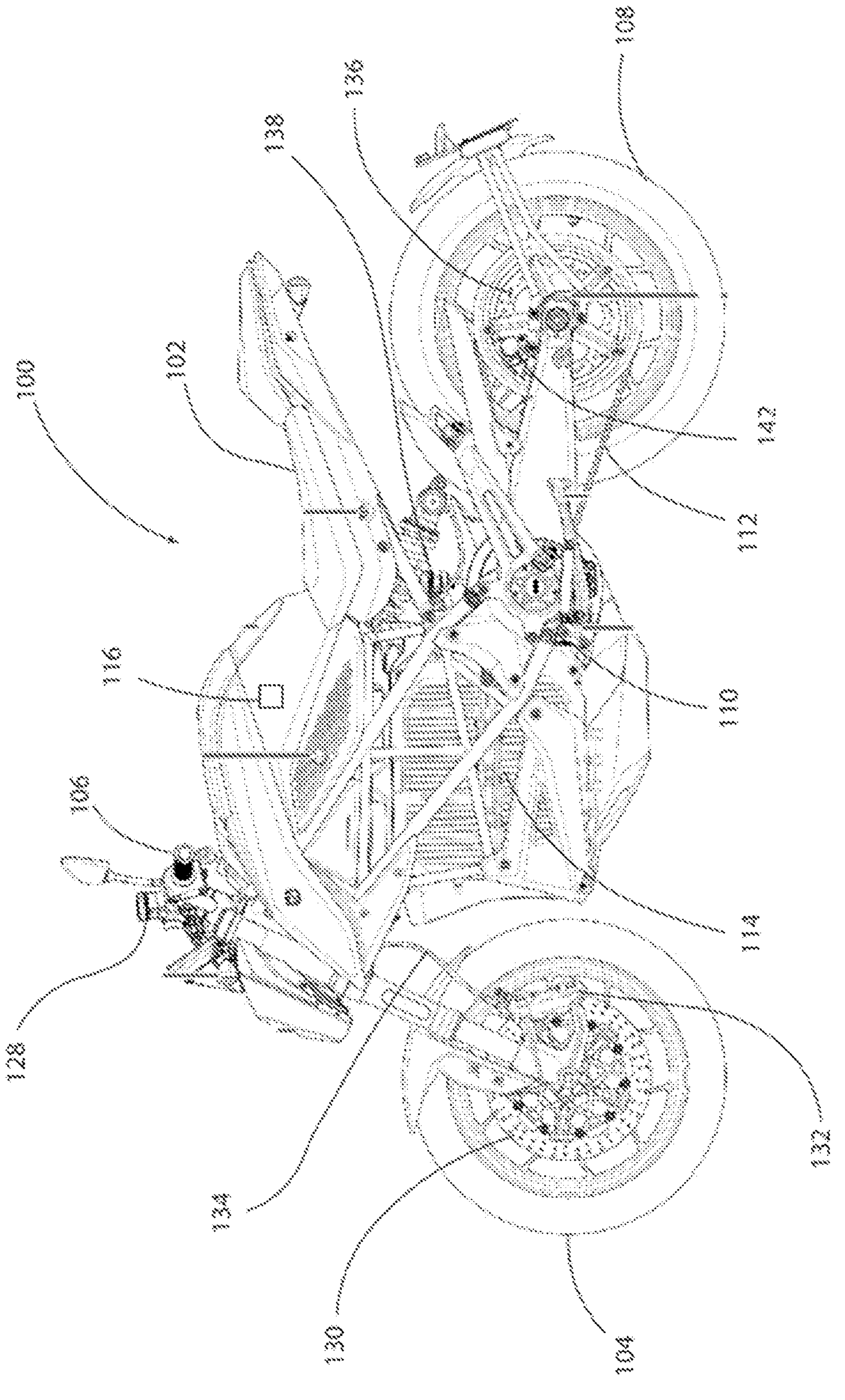
FIG. 1 is a left side view of an electric motorcycle according to an example embodiment of the present invention.
Figure 2:
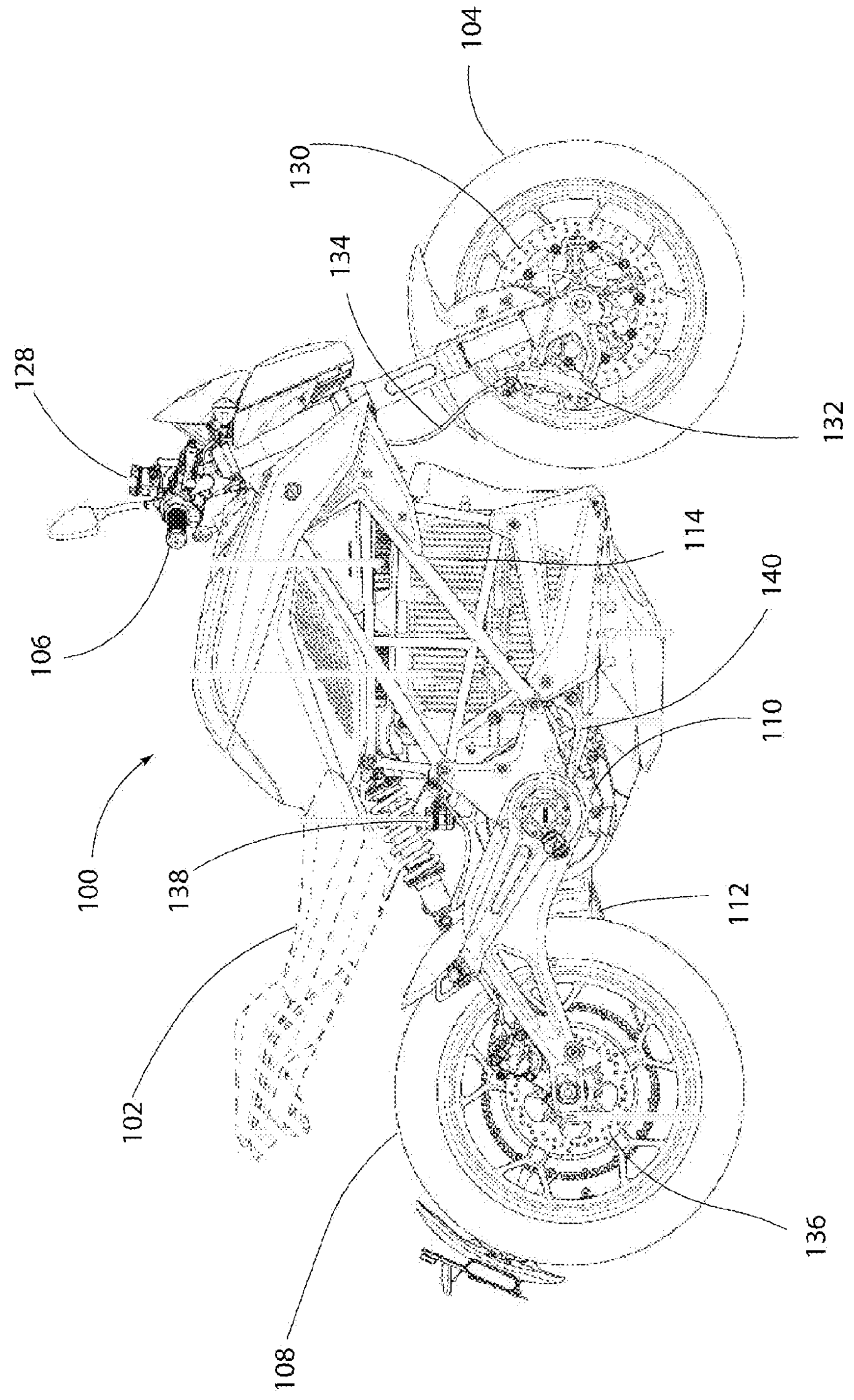
FIG. 2 is a right side view of the motorcycle.

FIG. 1 is a left side view of a vehicle 100 according to an example embodiment of the present invention, and FIG. 2 is a right side view of the vehicle 100. The vehicle 100 may be arranged as a two-wheeled vehicle, e.g., a motorcycle, and may be arranged as a hybrid vehicle, an electric vehicle (EV), a plug in hybrid electric vehicle (PHEV), etc. The vehicle 100 includes a seat 102 for the driver and, optionally, a passenger, a front wheel 104, which can be steered by the driver via the handlebar 106, and a rear wheel 108, which is driven by an electric motor 110 via belt or chain 112. It should be appreciated that the motor 110 may drive the rear wheel 108 via a drive shaft rather than a belt or chain 112. The vehicle 100 also includes an energy storage device 114, e.g., e.g., a battery, a rechargeable battery, a lithium-ion battery, etc. for supplying electrical energy to the motor 110, and a vehicle controller 116. The vehicle 100 includes a controller 116, which may be arranged as a single integrated unit, e.g., electronic control unit (ECU), or may include a plurality of units, e.g., ECUs, distributed throughout the vehicle 100. The controller 116 may include one or more processors, CPUs, etc., and one or more memory units storing, for example, software instructions, data, etc. The memory may be arranged as a non-transitory memory that stores a set of instructions that are executable by the processor(s), CPU(s), etc., to control various aspects, functions, components, etc., of the vehicle 100 under the control of, for example, the driver or operator of the vehicle 100.

Figure 3:
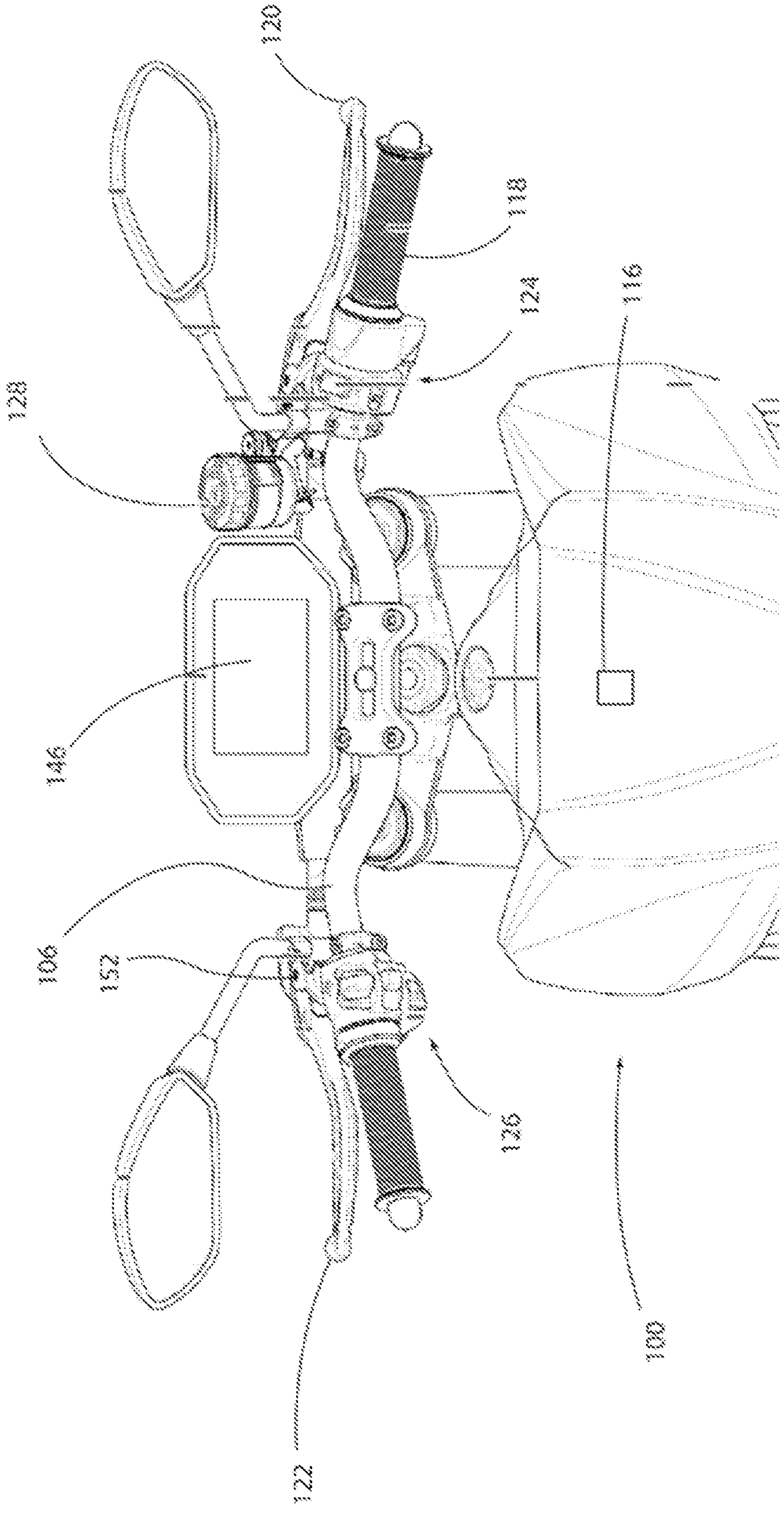
FIG. 3 is a top view of the motorcycle.

FIG. 3 is a top view of vehicle 100 and illustrates that right hand controls 124 are provided on the right-hand side of handlebar 106 and that left hand controls 126 are provided on the left-hand side of handlebar 106. Right hand controls 124 include, for example, a front brake lever 120 and throttle 118. The front brake lever 120 operates the front brake of vehicle 100 provided at the front wheel 104. For example, the front brake lever 120 is connected to front master cylinder 128 containing hydraulic brake fluid. When the front brake lever 120 is operated by the driver of the vehicle 100, the brake fluid contained in the front master cylinder 128 is pressurized and delivered via hydraulic line 134 to front brake caliper 132, in which brake pads apply pressure to front brake disk 130 to slow and stop the vehicle 100. In addition to a brake at the front wheel 104, the vehicle 100 includes a brake at the rear wheel 108. For example, a rear brake pedal 140 is connected to a rear master cylinder 138, also containing hydraulic brake fluid. When the rear brake pedal 140 is operated by the driver of the vehicle 100, the brake fluid contained in the rear master cylinder 138 is pressurized and delivered via a hydraulic line to rear brake caliper 142, in which brake pads apply pressure to rear brake disk 136 to slow and stop the vehicle 100. The front and rear brakes operate independently of each other. In addition, the vehicle 100 may be braked regeneratively by operating the motor 110 as a generator and delivering generated electrical energy to battery 114. The controller 116 may be adapted to control the regenerative braking. The throttle 118 controls acceleration and deceleration of the vehicle 100, e.g., under control of controller 116 to deliver electrical energy from the battery 114 to the motor 110 under the direction and control of the operator of the vehicle.

In certain implementations, the vehicle 100 does not include a multi-gear transmission; instead, the motor 110 drives the rear wheel 108 via belt or chain 112 (or a drive shaft, as mentioned above). Since a multi-gear transmission is not included in vehicle 100, the drive train of vehicle 100 does not include a clutch. In certain implementations, the vehicle 100 includes an automatic, multi-gear transmission that does not include a manually-operated clutch. As illustrated, for example, in FIG. 3, a left-hand control lever 122 is provided on handlebar 106. The control lever 122 is arranged, at least in part, as a pseudo-clutch lever and is arranged on the handlebar 106 where a clutch lever would typically be arranged on a motorcycle having a multi-gear transmission and clutch.

Figure 4:
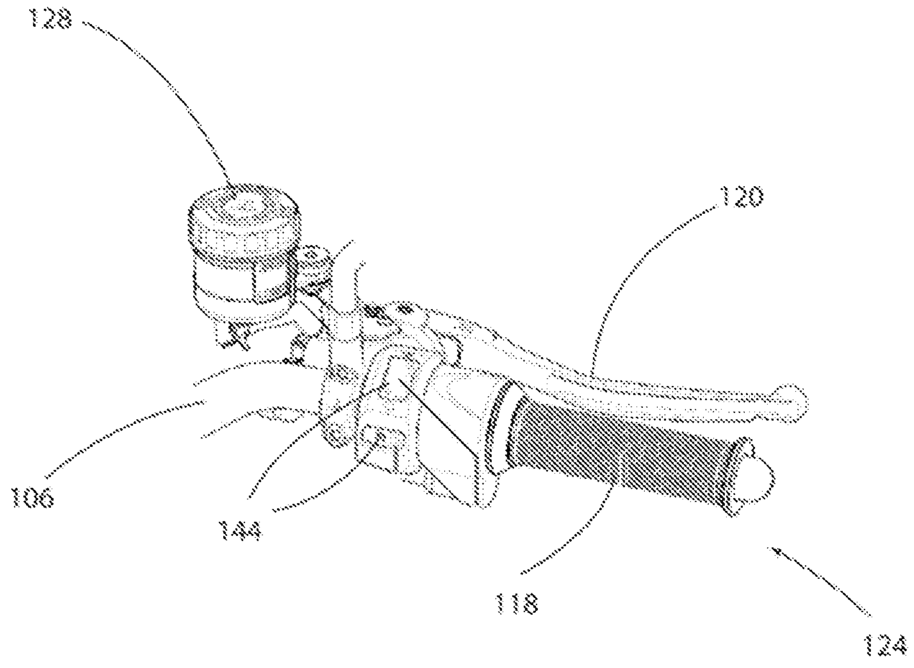
FIG. 4 illustrates the right-hand control of the motorcycle.
Figure 5:
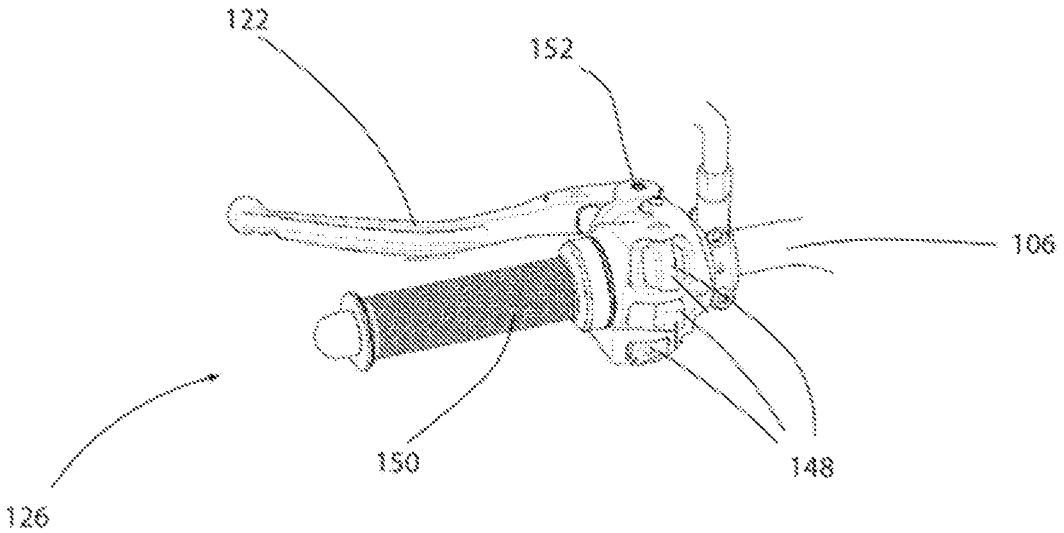
FIG. 5 illustrates the left-hand controls of the motorcycle.

Referring to FIG. 4, the right hand controls 124 of vehicle 100 further include switch(es), button(s), other control device(s) or operating elements, etc., 144 for controlling, operating, and interfacing with various aspects of the vehicle 100. Referring to FIG. 5, the left hand controls 126 of vehicle 100 include further include switch(es), button(s), other control device(s) or operating elements, etc., 148 for controlling, operating, and interfacing with various aspects of the vehicle 100. A hand grip 150 is also provided on the left-hand side of handlebar 106 for the driver of vehicle 100 to grip while operating the vehicle.

The left-hand control lever 122 is pivotable about pivot 152 toward and away from the hand grip 150 between a rest position, in which the left-hand control lever 122 is farthest from the hand grip 150, and a fully engaged position, in which the left-hand control lever is closest to the hand grip 150. A sensor senses the operation of the left-hand control lever 122 and provides a control signal to the controller 116 as an input. For example, the sensor may be arranged as a position sensor, which outputs a control signal indicative of the angular position and/or displacement of the left-hand control lever 122 relative to its rest position, a force sensor, which outputs a control signal indicative of force applied to the left-hand control lever 122 and/or indicative of the angular position and/or displacement of the left-hand control lever 122 relative to its rest position based on the applied force, a pressure sensor, which outputs a control signal indicative of the amount of compression of a spring and/or indicative of the angular position and/or displacement of the left-hand control lever 122 based on the amount of compression of the spring, a pressure sensor, which outputs a control signal indicative of gas or hydraulic pressure and/or indicative of the angular position and/or displacement of the left-hand control lever 122 based on the gas or hydraulic pressure, etc. Feedback to the driver of the vehicle 100 is provided, for example, by spring, gas, and/or hydraulic feedback.

Figure 6A:
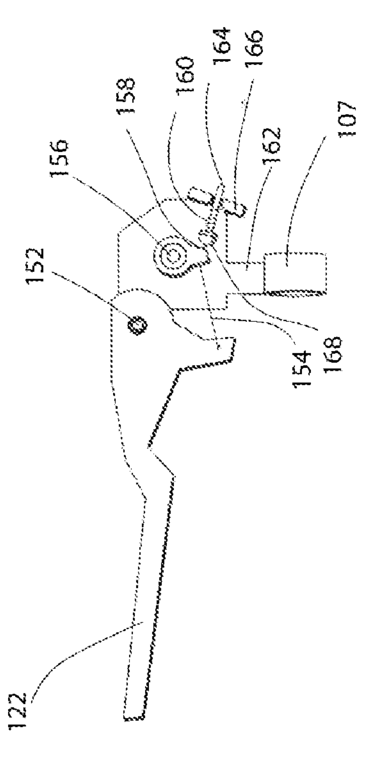
FIGS. 6*a* to 6*d* illustrate a position sensor of a hand lever of the motorcycle.
Figure 6B:
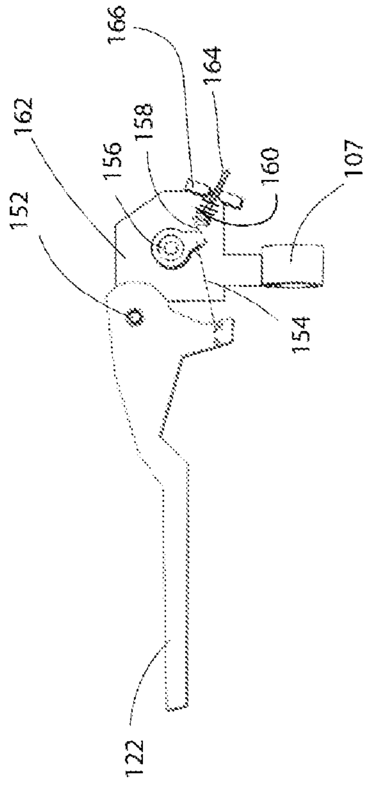
Figure 6C:
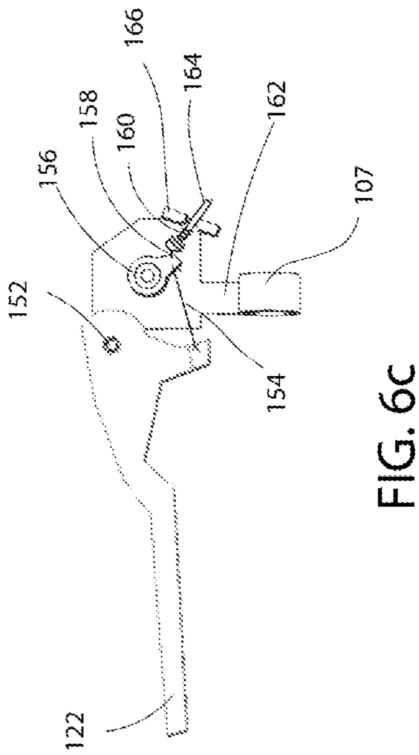
Figure 6D:
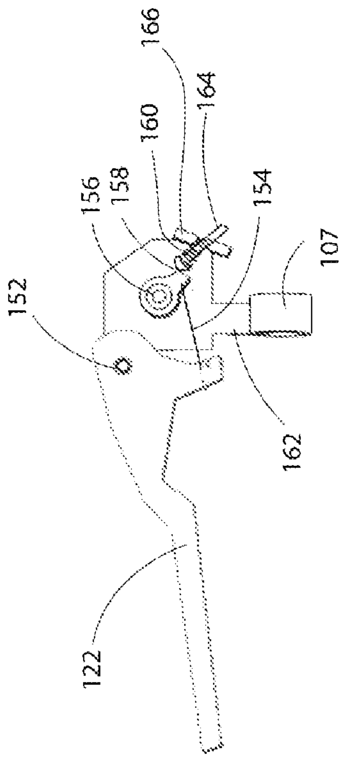

For example, FIGS. 6*a* to 6*d* illustrate an exemplary sensor system for determining the rotational position of the left-hand control lever 122. FIG. 6*a* illustrates the left-hand control lever 122 in its rest position, FIG. 6*d* illustrates the left-hand control lever 122 in its fully engaged position, FIG. 6*b* illustrates the left-hand control lever 122 in a first intermediate position between the rest position and the fully engaged position, and FIG. 6*c* illustrates the left-hand control lever 122 in a second intermediate position between the rest position and the fully engaged position. The position of the left-hand control lever illustrated in FIG. 6*b* is closer to the rest position than that illustrated in FIG. 6*c*, and the position of the left-hand control lever illustrated in FIG. 6*c* is closer to the fully engaged position than that illustrated in FIG. 6*b*. Thus, for example, as the driver of the vehicle 100 operates the left-hand control lever 122 from its rest position to its fully engaged position, the left-hand control lever 122 is initially in the rest position, as illustrated in FIG. 6*a*, passes through the position illustrated in FIG. 6*b*, then passes through the position illustrated in FIG. 6*c*, and reaches the fully engaged position illustrated in FIG. 6*d*.

The left-hand control lever 122 is pivotably mounted on a bracket 162 and is pivotable about pivot 152. The bracket 162 is mounted on handlebar 106 via clamp 107. Thus, the driver of vehicle 100 can operate the left-hand control lever 122 by pulling the left-hand control lever 122 toward hand grip 150. The left-hand control lever 122 is spring-loaded and returns to its rest position, illustrated in FIG. 6*a*, unless pulled by the driver of the vehicle 100. The left-hand control lever 122 is connected to a linkage 154, which, in turn, is connected to a rotational sensor 156. As the driver pulls the left-hand control lever 122 toward the hand grip 150, the left-hand control lever 122 pivots about pivot 152, causing the linkage 154 to effect rotation of rotational sensor 156. Thus, the rotational position and displacement of rotational sensor 156 is directly related to the rotational position and displacement of the left-hand control lever 122, and the output signal of the rotational sensor 156 can be used to determine the rotational position and/or displacement of the left-hand control lever 122. The rotational sensor 156 is connected via another linkage 158 to a spring-loaded rod 164. The rod 164 has an enlarged and/or bulbous head 168; one end of a compression spring 160 rests against the underside of head 168, and the opposite end of spring 160 rests against a yoke 166 of bracket 162. The end of rod 164 located opposite to head 168 extends through the yoke 166. Thus, as the rod 164 is urged toward yoke 166, spring 160 urges the rod 164 in the opposite direction. The spring rate of the spring 160 may be selected to provide the desired feedback to the driver of the vehicle 100 and may be, for example, linear, straight, non-linear, progressive, etc.

The pin or rod 164 provides tactile feedback to the driver of the vehicle 100 via spring 160. For example, as the driver of the vehicle 100 operates the left-hand control lever 122 is pivoted about pivot 152, thereby causing the linkage 154 to rotate the position sensor 156, which, in turn, pushes the rod 164 toward yoke 166 via linkage 158. Due to the compression of spring 160, the spring 160 imparts an opposite force, which the driver of the vehicle 100 can sense as tactile feedback. As the left-hand control lever 122 is moved from its rest position toward its fully engaged position, the rod 164 moves toward yoke 166 and also pivots relative to yoke 166, depending upon the kinematic relationship among the left-hand control lever 122, the linkages 154, 158, rotational sensor 156, yoke 166, etc. To mimic the feel of a traditional clutch, the kinematic relationship among the left-hand control lever 122, the linkages 154, 158, rotational sensor 156, yoke 166, etc., may be configured such that the driver of the vehicle 100 initially feels a steep ramp up in resistance when moving the left-hand control lever 122 away from its rest position, followed by a peak dwell or plateau, then followed by a significant let off, as the left-hand control lever 122 approaches its fully retracted position. As the driver of the vehicle 100 reduces pressure on the left-hand control lever 122, it is urged toward its rest position by spring 160.

Figure 7:
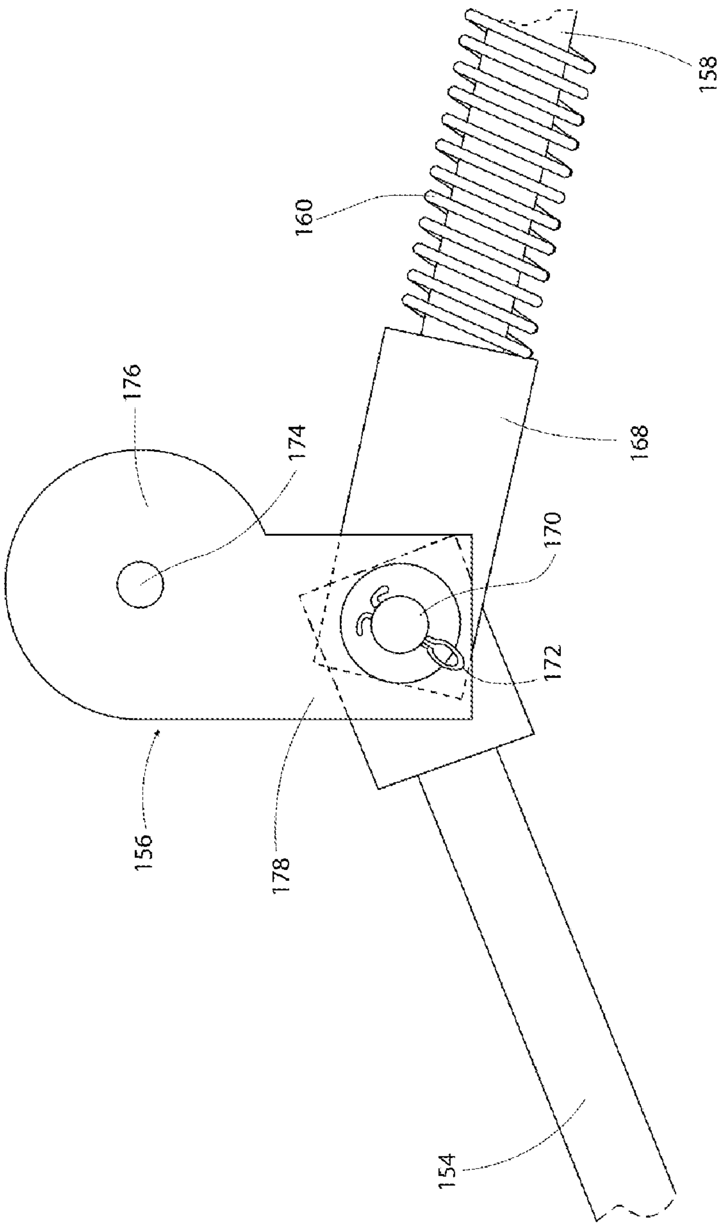
FIG. 7 further illustrates the position sensor.

FIG. 7 further illustrates sensor 156 and linkages 154, 158. Sensor 156 includes a rotatable portion 176, which is rotatable about axis 174 and which includes a clevis 178. Linkage 154 is connected to left-hand control lever 122, and the output of rotational sensor 156 is dependent upon the rotation of the left-hand control lever 122, as described above. Linkages 154, 158 are connected to clevis 178 via clevis pin 170 and is secured thereto via cotter pin, split pin, R-clip, hairpin clip, etc. 172. While a compression spring 160 may be used to urge left-hand control lever 122 toward its rest position and provide feedback to the driver of the vehicle 100, a torsion spring may be utilized to urge rotatable portion 176 of sensor 156 toward its rest position and, consequently, left-hand control lever 122 toward its rest position and to provide feedback to the driver of the vehicle 100.

As noted above, vehicle 100 does not include a multi-gear transmission or clutch, but may include an automatic multi-gear transmission without a manually-operated clutch. Therefore, operating the left-hand control lever 122 does not operate a clutch of the vehicle 100. Instead, the left-hand control lever 122 may be configured to mimic or replicate operation of a clutch of a multi-gear transmission by reducing torque output by motor 110. For example, as the left-hand control lever 122 is moved by the driver from its rest position toward its fully-engaged position, sensor 156 outputs a control signal indicative of, for example, the rotational position and/or displacement of the left-hand control lever 122, which the controller 116 receives as an input and reduces the torque output by the motor 110, providing the driver of the vehicle 100 with an additional input to further fine tune and control operation of the vehicle 100. By reducing the torque output by the motor 110, left-hand control lever 122 mimics the operation and feel, e.g., slip, of a clutch of a multi-gear transmission present in motorcycles and other vehicles that are powered by internal combustion engines.

The driver of certain electric motorcycles typically has only three operational inputs: the throttle 118, the front brake lever 120, and the rear brake pedal 140. The addition of the left-hand control lever 122 provides an additional operational input, which enhances the driver's experience and control of vehicle 100. For example, the operation of the left-hand control lever 122 can be used as an input by the controller 116 to control regenerative braking, torque output by the motor 110, etc.

As an input for controlling regenerative braking, the controller 116 receives signals from the sensor 156 indicative of, for example, the rotational position of the left-hand control lever 122, the angular displacement of the left-hand control lever 122, force and/or pressure applied to the left-hand control lever 122, etc., as a desired, requested, or setpoint level of regenerative braking demanded by the driver of the vehicle 100. Thus, the controller 116 causes the motor 110 to operate as a generator to deliver electrical energy to battery 114 and brake the vehicle 100 as a function of the rotational position, angular displacement, force and/or pressure applied to the left-hand control lever 122. Additionally, the controller 116 may take into account the rate of change of the rotational position, angular displacement, force and/or pressure applied to the left-hand control lever 122 in determining the amount of regenerative braking to be applied. For example, a rapid movement of the left-hand control lever 122 may indicate that the driver of vehicle 100 is demanding a very high level of regenerative braking, e.g., while making an emergency stop, whereas a slower movement of the left-hand control lever 122 may indicate less drastic regenerative braking demands. Utilizing the rate of change of the signal from the sensor 156 may increase driver safety, particularly during emergency braking. For example, in an emergency application of the front brake by rapidly applying pressure to the front brake lever 120, the driver risks locking the front wheel 104, causing the vehicle 100 to skid, causing the driver to lose steering control of the vehicle 100, causing the driver to be thrown forward over the front wheel 108, etc. The controller 116 may reduce the amount and/or rate of braking, e.g., to achieve maximum braking while avoiding locking of the wheel(s) 104, 108, based on the rate of change of the position of the left-hand control lever 122 based on the output signal of the rotational sensor 156. The controller 116 may also command regenerative braking based on additional inputs and signals, including throttle position, vehicle speed, state-of-charge (SOC) of the battery 114, ambient temperature, temperature of motor 110, temperature of battery 114, battery current limits, etc.

For example, the controller 116 may apply regenerative braking based on and/or as a function of a combination of signals from the throttle 118 and the left-hand control lever 122. In this regard, the controller 116 may reduce torque demand, which is based on the rotational position of throttle 118, in accordance with the rotational position of the left-hand control lever 122. Doing so would, for example, replicate the feel of a mechanical rear brake, by reducing torque output at the rear wheel 108. In response to brake demand, based on the rotational position of the left-hand control lever 122, exceeding torque demand, based on the rotational position of the throttle 118, the controller 116 may command the motor 110 to brake the vehicle 100 regeneratively. Thus, the driver of vehicle 100 may achieve greater control of vehicle 100 by utilizing the left-hand control lever 122, e.g., in combination with operation of the throttle 118, front brake lever 120, and/or rear brake pedal 140, etc.

The rotational position of the throttle 118 may be indicative of positive torque demanded by the driver of vehicle 100, whereas the rotational position of the left-hand control lever 122 may be indicative of negative torque demanded by the driver of the vehicle 100. Thus, the controller 116 may be adapted to reduce the torque output by motor 110 reducing the positive torque demanded by the driver based on the throttle position by the negative torque demanded by the driver based on the position of the left-hand control lever 122.

The controller 116 may be adapted to alter or modify the torque output of the motor 110 of the vehicle 100 based on the operation of the left-hand control lever 122. Doing so may replicate the operation and feel of a clutch of a multi-gear transmission. For example, a signal from sensor 156 that indicates the rotational position of the left-hand control lever 122 may be input to the controller 116, which causes the torque output of motor 110 to be reduced as a function of the rotational position of the left-hand control lever 122. Additionally, the rate of change of the signal from the sensor 156, e.g., indicating the speed at which the left-hand control lever 122 is operated, may be taken into account by the controller 116 in adjusting the torque output of the motor 110. For example, rapidly releasing the left-hand control lever 122 from its fully engaged position may cause the controller 116 to demand a short burst of torque from the motor 110 that exceeds the torque demand indicated by the position of throttle 118, simulating or replicating the feel of "dropping the clutch" in a vehicle that includes a multi-gear transmission and clutch. For example, a quick release of the left-hand control lever 122 may be detected by the sensor 156 and may cause the controller 116 to increase the torque output of the motor 110 as a predetermined multiple or other function of the torque demand as indicated by the throttle 118.

Figure 8:
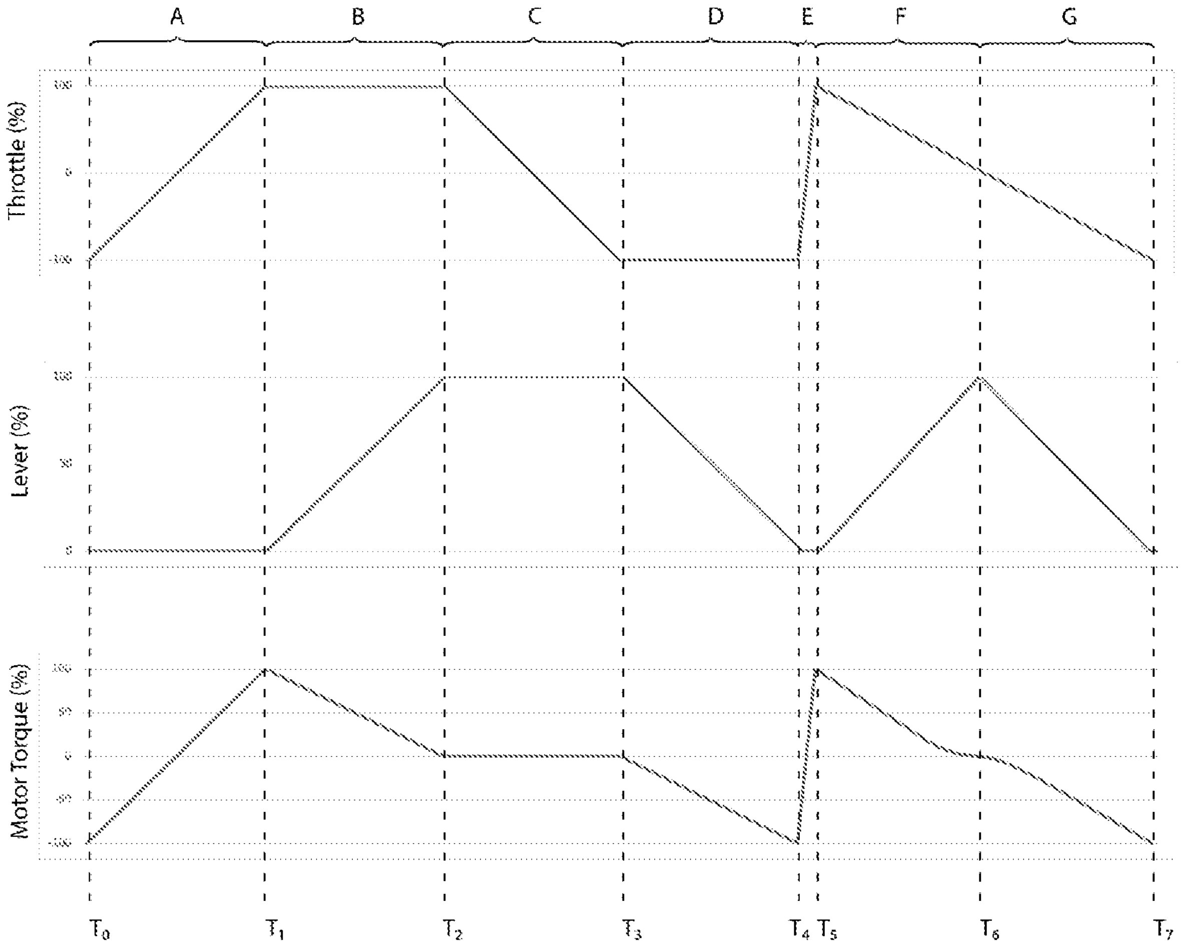
FIG. 8 illustrates an exemplary relationship among throttle position, left-hand lever position, and motor torque, in which the lever simulates a clutch.

FIG. 8 illustrates an exemplary relationship among throttle position, left-hand control lever position, and motor torque, in which the left-hand control lever 122 simulates a clutch. At $T_0$, the position of the throttle 118 represents maximum regenerative braking demand, e.g., −100%, and the left-hand control lever 122 is at its rest position, e.g., 0%. Thus, at $T_0$, the controller 116 controls motor 110 to operate at maximum regenerative braking, e.g., −100%. Between $T_0$ and $T_1$, the operator moves the position of the throttle 118 from −100% to a position represented maximum drive or torque demand, e.g., 100%, without changing the position of the left-hand control lever 122. Thus, at $T_1$, the controller 116 controls motor 110 to operate at maximum output torque, e.g., 100%. Since the left-hand control lever 122 remains at its rest position in portion A, controller 116 controls motor 110 based on the position of the throttle 118. Between $T_1$ and $T_2$, the driver maintains the throttle 118 at its maximum position, e.g., 100%, and moves the left-hand control lever 122 to its maximum position, e.g., 100%. Simulating the operation of a clutch lever, in portion B, the controller 116 controls motor 110 to reduce its output torque from 100% to 0% based on the position of the left-hand control lever 122. Between $T_2$ and $T_3$, the driver maintains the left-hand control lever 122 at its maximum position and moves the throttle 118 from its maximum drive demand position to its maximum regenerative braking demand position. The controller 116 continues to operate the motor 110 at zero output torque. Thus, simulating the operation of a clutch lever, in portion C, the motor 100 maintains zero output torque. Between $T_3$ and $T_4$, the driver maintains the throttle 118 at its position representing maximum regenerative braking demand and releases the left-hand control lever 122. Thus, in portion D, the controller 116 controls the motor 110 to increase regenerative braking. Between $T_4$ and $T_5$, the driver operates the throttle 118 to its maximum drive demand position while maintaining the left-hand control lever 122 at its rest position. Thus, in portion E, the controller 116 controls motor 110 to increase to 100% torque output. Between $T_5$ and $T_6$, the driver moves the throttle 118 to its rest position and moves the left-hand control lever 122 to its maximum position. Thus, in portion F, the controller 116 controls motor 110 to decrease its output torque from 100% to 0%. Between $T_6$ and $T_7$, the driver releases the left-hand control lever 122, allowing it to return to its rest position, and moves throttle 118 to its position representing maximum regenerative braking demand Thus, in portion G, the controller 116 controls motor 110 to produce its maximum regenerative braking. For example, as illustrated in FIG. 8, controller 116 controls motor 100 to output torque according to the relationship:

$$MTD = \frac{TP * (100 - LP)}{100}$$

in which MTD represents motor torque demand, TP represents position of throttle 118, and LP represents position of left-hand control lever 122, each expressed as a percentage. In other words, FIG. 8 illustrates left-hand control lever 122 simulating the behavior of a manual clutch, in which (a) when the left-hand control lever 122 is fully deployed, the position of the throttle 118 has no impact on the output torque of the motor 110, (b) when the left-hand control lever 122 is released, the position of the throttle 118 fully controls the output torque of the motor 110, and (c) partial activation of the left-hand control lever 122 reduces the output torque of the motor 110 in accordance with the position of the left-hand control lever.

Figure 9:
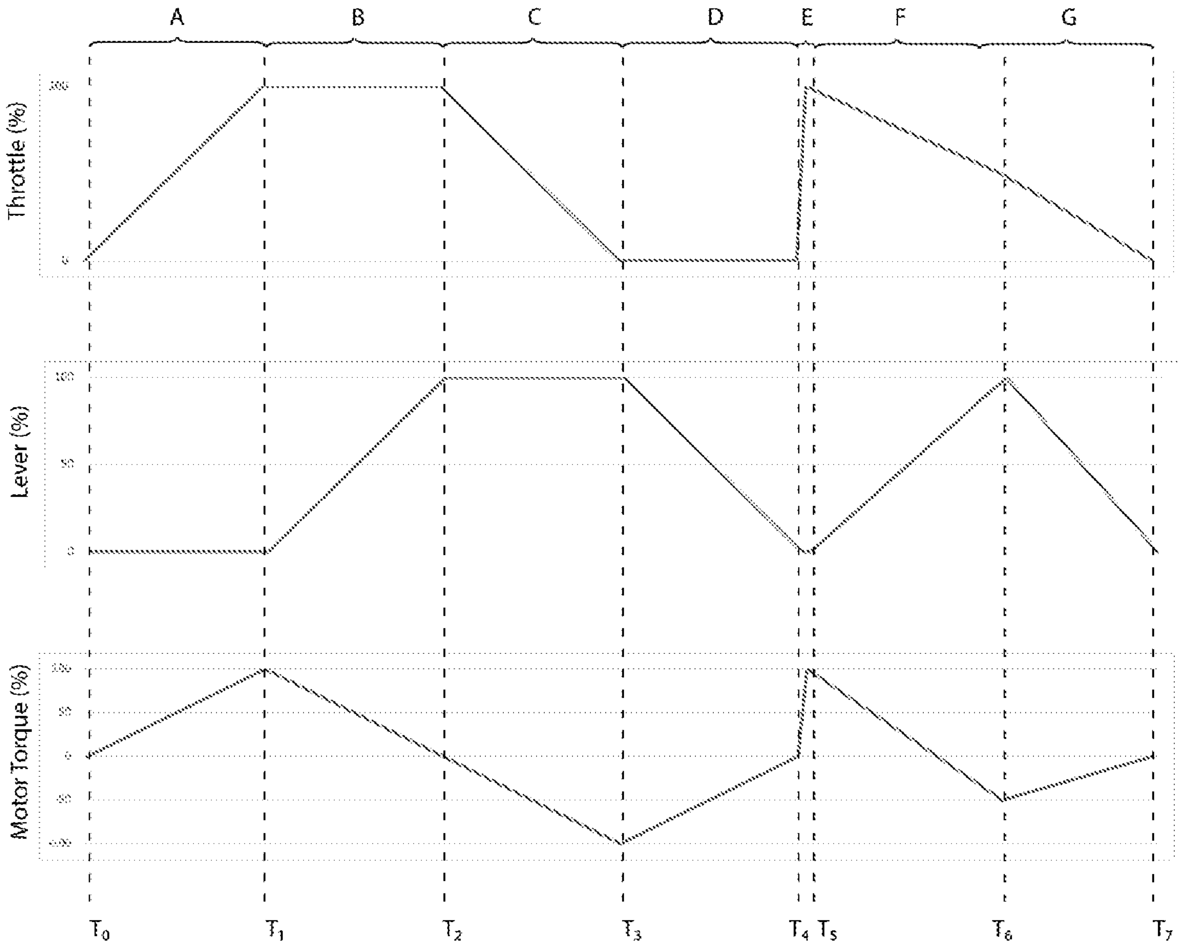
FIG. 9 illustrates an exemplary relationship among throttle position, left-hand lever position, and motor torque, in which the lever simulates a brake.
Figure 10:
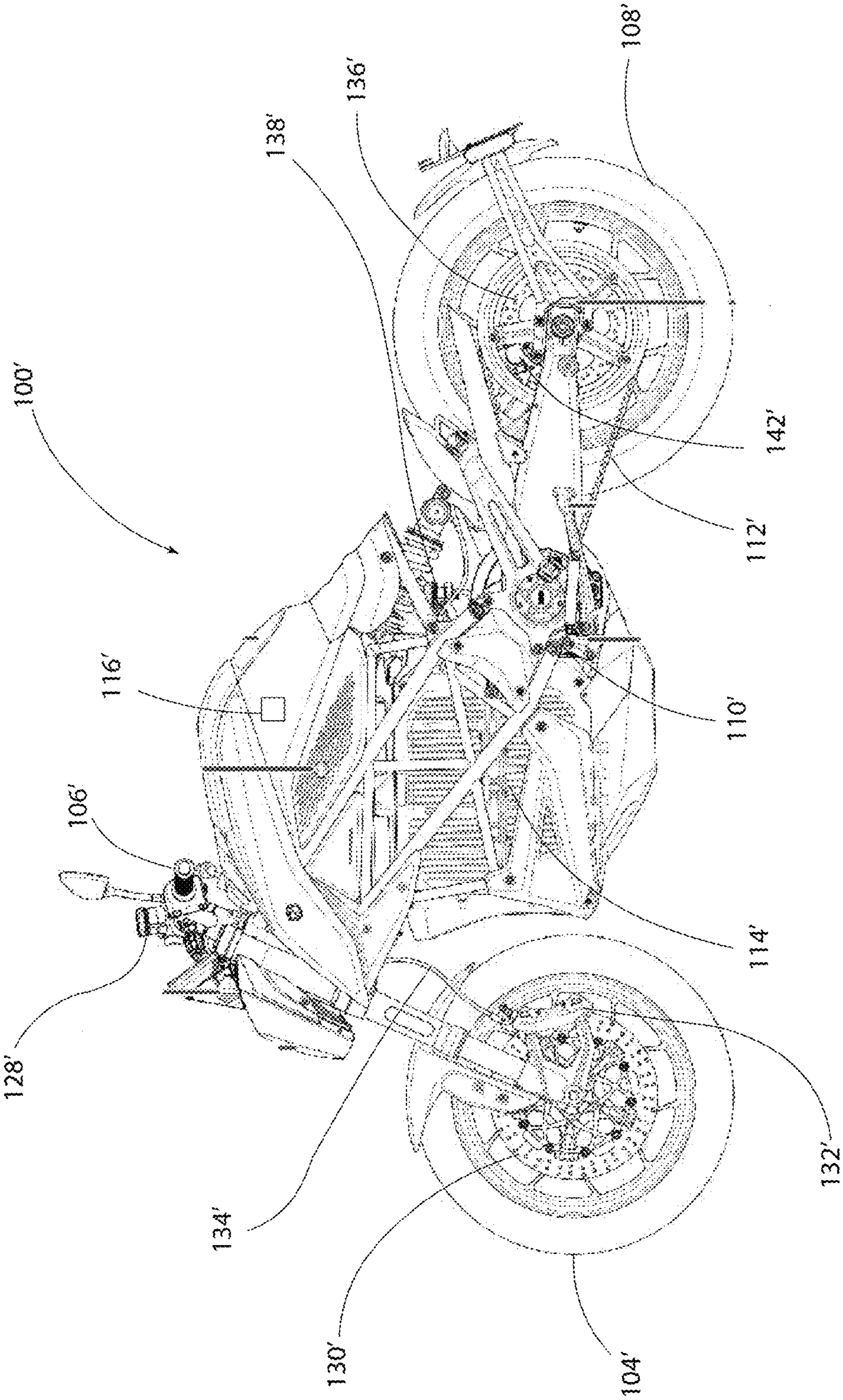
FIG. 10 is a left side view of an electric motorcycle, arranged as a trials motorcycle that does not include a seat, according to an example embodiment of the present invention.

FIG. 9 illustrates an exemplary relationship among throttle position, left-hand control lever position, and motor torque, in which the left-hand control lever 122 simulates a brake. At $T_0$, the position of the throttle 118 represents zero torque demand, e.g., 0%, and the left-hand control lever 122 is at its rest position, e.g., 0%. Thus, at $T_0$, the controller 116 controls motor 110 to operate at zero torque, 0%. Between $T_0$ and $T_1$, the operator moves the position of the throttle 118 from 0% to a position represented maximum drive or torque demand, e.g., 100%, without changing the position of the left-hand control lever 122. Thus, at $T_1$, the controller 116 controls motor 110 to operate at maximum output torque, e.g., 100%. Since the left-hand control lever 122 remains at its rest position in portion A, controller 116 controls motor 110 based on the position of the throttle 118. Between $T_1$ and $T_2$, the driver maintains the throttle 118 at its maximum position, e.g., 100%, and moves the left-hand control lever 122 to its maximum position, e.g., 100%. Simulating the operation of a brake lever, in portion B, the controller 116 controls motor 110 to reduce its output torque from 100% to 0% based on the position of the left-hand control lever 122. Between $T_2$ and $T_3$, the driver maintains the left-hand control lever 122 at its maximum position and moves the throttle 118 from its maximum drive demand position to rest position, e.g., 0%. The controller 116 causes the motor 100 to reduce its output torque from 100% to −100%, e.g., maximum regenerative braking. Thus, simulating the operation of a brake lever, in portion C, the motor 110 brakes the vehicle 100 by regenerative braking. Between $T_3$ and $T_4$, the driver maintains the throttle 118 at its rest position and releases the left-hand control lever 122. Thus, in portion D, the controller 116 controls the motor 110 to reduce regenerative braking to zero. Between $T_4$ and $T_5$, the driver operates the throttle 118 to its maximum drive demand position while maintaining the left-hand control lever 122 at its rest position. Thus, in portion E, the controller 116 controls motor 110 to increase to 100% torque output. Between $T_5$ and $T_6$, the driver reduces the throttle 118 partially to its rest position and moves the left-hand control lever 122 to its maximum position. Thus, in portion F, the controller 116 controls motor 110 to decrease its output torque from 100% to −50%. Between $T_6$ and $T_7$, the driver releases the left-hand control lever 122, allowing it to return to its rest position, and continues moving throttle 118 to its rest position. Thus, in portion G, the controller 116 controls motor 110 to reduce its regenerative braking to zero. For example, as illustrated in FIG. 9, controller 116 controls motor to output torque according to the relationship:

$$MTD = TP - LP$$

in which MTD represents motor torque demand, TP represents position of throttle 118, and LP represents position of left-hand control lever 122, each expressed as a percentage. In other words, FIG. 9 illustrates left-hand control lever 122 simulating the behavior of a brake lever, in which the position of the left-hand brake lever 122 reduces the torque output of the motor 110 and commands regenerative braking, e.g., overriding or having priority over the position of the throttle 118.

It should be understood that the relationships illustrated in FIGS. 8 and 9 are simplified representations and that, for example, maximum torque output and/or maximum regenerative braking may be influenced by additional parameters, including, for example, temperatures of various components of the vehicle 100, state of charge of the battery 114, other vehicle parameters relating to safety, comfort, driving mode, etc.

Additionally, the driver of vehicle 100 can operate the left-hand control lever 122 and throttle 118 (and front brake lever 120 and rear brake pedal 140) in a manner that further replicates the feel of a clutch of a multi-gear transmission. For example, the position of the throttle 118 is indicative of torque demand and position and/or rate of change of position of the left-hand control lever 122 is indicative of attenuation of that torque demand Thus, for example, the drive of vehicle 100 may move the throttle 118 into a position of high torque demand and modulate the torque output by motor 110 based on operation of the left-hand control lever 122, similar in manner as a clutch and throttle are used to store and release energy from a mechanical flywheel. Operating the vehicle 100 in this manner provides additional control over the vehicle 100 and more robust or more finely tuned control. The controller 116 may be adapted to provide visual, audible, and/or tactile feedback to the driver of vehicle 100 based on and indicative of the energy that is available to be released by operation of the left-hand control lever 122. For example, the controller 116 may operate light(s) of the vehicle 100, display 146, other visual indicator(s), vibration generated by piezo element(s), and/or sound, e.g., as a combination of tone, pitch, and/or volume, etc., to indicate to the driver of vehicle 100 the amount of energy that is available to be released by operation of the left-hand control lever 122. Using audible and/or tactile feedback can replicate the sound and feel of the rotational speed of an internal combustion engine. For example, at a high rotational speed, the sounds and vibrations emitted by an internal combustion engine are typically higher in amplitude and frequency as compared to a low rotational speed. Therefore, the controller 116 may be configured to cause a sound output device and/or a vibration generation device to have higher output amplitudes and frequencies based on, e.g., proportional to, the rotational position of the throttle 118 as feedback to the driver of the vehicle 100.

It should be appreciated that the vehicle 100 may be adapted for trials riding, in which case the vehicle 100 may not include a seat 102, as indicated with broken lines in FIG. 2. In trials riding, the response times of the vehicle 100 based on driver input must be significantly faster than street riding. Trials riding typically demands response times on the order of 30 ms or less, for example. In trials riding, the vehicle 100 may have a so-called fast or quick throttle, which may be in a fully open position at one-half or one-quarter turn, as compared to a so-called slow throttle included in street motorcycles that require, for example, ⅝ or greater turn to move to its fully open position. By including left-hand control lever 122 in an electric motorcycle for trials riding, the driver has greater and more robust control over vehicle 100.

While vehicle 100 is described as an electric motorcycle, it should be appreciated that vehicle 100 may be arranged as any type of vehicle, e.g., an electric vehicle. For example, the vehicle 100 may be arranged as an all-terrain vehicle (ATC), a side-by-side vehicle, an off-road vehicle (ORV), a utility transport vehicle (UTV), a quad vehicle, a three-wheeler, a powersports vehicle, automobile, etc. Moreover, in certain implementations, the vehicle 100 does not include a clutch and/or multi-gear transmission, whereas in other implementations, the vehicle 100 includes a multi-gear transmission but does not include a manually-operated clutch. For example, the vehicle 100 may include an automatic transmission, e.g., that does not require the use of a manually-operated clutch. Additionally, while control lever 122 is described as being mounted on the left-hand side of handlebar 106, it should be appreciated that the operation and functionality of control lever 122 may be provided by other operational control device(s) included in vehicle 100. For example, a motorcycle that includes a multi-gear transmission typically includes a gear shifter located in front of a left foot peg and operated by the left foot of the driver. In an electric motorcycle that does not include a multi-gear transmission, such a gear shifter is not included. Therefore, a left-hand pedal may be provided as an alternative and/or in addition to the left-hand control lever 122 to provide additional input for operation of the vehicle 100.

LIST OF REFERENCE CHARACTERS

100 motorcycle
102 seat
104 front wheel
106 handlebar
107 clamp
108 rear wheel
110 electric motor
112 belt or chain
114 battery
116 vehicle controller
118 throttle
120 front brake lever
122 left-side control lever
124 right hand controls
126 left hand controls
128 front brake master cylinder
130 front disk brake
132 front brake caliper
134 hydraulic line
136 rear brake disk
138 rear brake master cylinder
140 rear brake pedal
142 rear brake caliper
144 buttons/switches
146 display
148 buttons/switches
150 left hand grip
152 pivot
154 linkage
156 sensor
158 linkage
160 spring
162 bracket
164 rod
166 yoke
168 head
170 clevis pin
172 cotter pin
174 axis
176 rotatable portion
178 clevis

What is claimed is:

1. A control system for an electric vehicle including an electric motor, an energy storage device, a front brake, and a rear brake, the electric motor being operable as a motor supplied with electrical energy from the energy storage device to drive at least one wheel of the vehicle to propel the vehicle, the electric motor operable as a generator to regeneratively brake the vehicle, comprising:

a first control device adapted to output a first signal indicative of a torque demand from the electric motor;

a second control device adapted to output a second signal indicative of a negative torque demand from the electric motor; and a controller adapted to receive the first signal and the second signal and to control the electric motor in accordance with the first signal and the second signal;

wherein the controller is adapted to control the electric motor to propel the vehicle in response to the torque demand indicated by the first signal exceeding the negative torque demand indicated by the second signal and to control the electric motor to regeneratively brake the vehicle in response to the negative torque demand indicated by the second signal exceeding the torque demand indicated by the first signal;

wherein the second control device is independent of the front brake of the vehicle and independent of the rear brake of the vehicle; and wherein the controller is adapted to control the electric motor based on a rate of change of the second signal.

2. The control system according to claim 1, wherein the first control device includes a throttle mounted on a handlebar of the vehicle.

3. The control system according to claim 1, wherein the second control device includes a hand-operable lever mounted on a handlebar of the vehicle.

4. The control system according to claim 1, wherein the first control device includes a throttle mounted on a first side of a handlebar of the vehicle, and the second control device includes as a hand-operable lever mounted on a second side of the handlebar opposite the first side.

5. The control system according to claim 1, wherein the motor is adapted to recharge the energy storage device in a generator mode.

6. The control system according to claim 1, wherein the vehicle is arranged as a two-wheel electric vehicle.

7. The control system according to claim 1, wherein the vehicle does not include a manually-operated clutch.

8. The control system according to claim 1, wherein the second control device is independent of a front brake lever of the vehicle and the independent of a rear brake pedal of the vehicle.

9. The control system according to claim 1, wherein the vehicle includes a front brake lever arranged on a first side of a handlebar of the vehicle and adapted to engage the front brake of the vehicle and a rear brake pedal adapted to engage the rear brake of the vehicle, the first control device including a throttle and is arranged on the first side of the handlebar of the vehicle, the second control device including a hand-operated lever and arranged on a second side of the handlebar opposite the first side.

10. The control system according to claim 1, wherein the second control device includes a hand-operated lever and a rotational sensor adapted to detect a rotation of the lever and to output the second signal based on the rotation of the lever.

11. The control system according to claim 1, wherein the second control device includes a spring-loaded, hand-operated lever and a spring adapted to urge the lever toward a rest position and to provide tactile feedback to a driver of the vehicle.

12. The control system according to claim 10, wherein the rotational sensor is adapted to output the second signal indicative of a rotational position of the lever.

13. The control system according to claim 10, wherein the rotational sensor is adapted to output the second signal indicative of a rotational displacement of the lever.

14. The control system according to claim 1, wherein the controller is adapted to control an output device adapted to output audible, visual, and/or tactile signal based on the first and/or second signals.

15. A two-wheel electric vehicle, comprising:
a front wheel;
a rear wheel;
a front brake;
a rear brake;
an energy storage device;
an electric motor operable as a motor supplied with electrical energy from the energy storage device to drive the rear wheel to propel the vehicle and operable as a generator to regeneratively brake the vehicle; and
a control system, including:
a first control device adapted to output a first signal indicative of a torque demand from the electric motor;
a second control device adapted to output a second signal indicative of a negative torque demand from the electric motor; and
a controller adapted to receive the first signal and the second signal and to control the electric motor in accordance with the first signal and the second signal;
wherein the controller is adapted to control the electric motor to propel the vehicle in response to the torque demand indicated by the first signal exceeding the negative torque demand indicated by the second signal and to control the electric motor to regeneratively brake the vehicle in response to the negative torque demand indicated by the second signal exceeding the torque demand indicated by the first signal;
wherein the second control device is independent of the front brake of the vehicle and independent of the rear brake of the vehicle; and
wherein the controller is adapted to control the electric motor based on a rate of change of the second signal.

16. The vehicle according to claim 15, further comprising:
a handlebar;
a front brake lever arranged on a first side of the handlebar of the vehicle and adapted to engage the front brake of the vehicle; and
a rear brake pedal adapted to engage the rear brake of the vehicle;
wherein the first control device includes a throttle and is arranged on the first side of the handlebar of the vehicle, and the second control device includes a hand-operated lever and is arranged on a second side of the handlebar opposite the first side.

17. A method of controlling an electric vehicle, including an electric motor, an energy storage device, a front brake, and a rear brake, the electric motor being operable as a motor supplied with electrical energy from the energy storage device to drive at least one wheel of the vehicle to propel the vehicle, the electric motor operable as a generator to regeneratively brake the vehicle, comprising:
outputting a first signal by a first control device, to a controller, indicative of a torque demand from the electric motor;
outputting a second signal by a second control device, to the controller, indicative of a negative torque demand from the electric motor; and
controlling the electric motor, by the controller, in accordance with the first signal, the second signal, and a rate of change of the second signal, by controlling the electric motor to propel the vehicle in response to the torque demand indicated by the first signal exceeding the negative torque demand indicated by the second signal and controlling the electric motor to regeneratively brake the vehicle in response to the negative torque demand indicated by the second signal exceeding the torque demand indicated by the first signal;
wherein the second signal output by the second control device is independent of the front brake of the vehicle and independent of the rear brake of the vehicle.

* * * * *